(12) United States Patent
    Dettbarn et al.

(10) Patent No.: US 11,258,862 B2
(45) Date of Patent: Feb. 22, 2022

(54) INTELLIGENT PERSISTENT MOBILE DEVICE MANAGEMENT

(71) Applicant: Addigy, Inc., Miami, FL (US)

(72) Inventors: Jason Dettbarn, Miami, FL (US);
    Javier Carmona, Miami, FL (US);
    Carlos Ruiz, Hialeah, FL (US)

(73) Assignee: Addigy, Inc., Miami, FL (US)

( * ) Notice: Subject to any disclaimer, the term of this patent is extended or adjusted under 35 U.S.C. 154(b) by 46 days.

(21) Appl. No.: 16/538,765

(22) Filed: Aug. 12, 2019

(65) Prior Publication Data
    US 2021/0051204 A1    Feb. 18, 2021

(51) Int. Cl.
    *H04L 29/08*    (2006.01)
    *H04L 67/145*    (2022.01)
(52) U.S. Cl.
    CPC .................. *H04L 67/145* (2013.01)
(58) Field of Classification Search
    CPC .............. H04L 65/4007; H04L 67/101; H04L 67/1012; H04W 76/25
    See application file for complete search history.

(56) References Cited

U.S. PATENT DOCUMENTS

| | | | | |
|---|---|---|---|---|
| 10,055,273 B2* | 8/2018 | Wang | .................. | G06F 11/0754 |
| 10,733,073 B1* | 8/2020 | Watts | .................. | G06F 11/3414 |
| 2008/0155564 A1* | 6/2008 | Shcherbina | ............ | G06Q 10/04 |
| | | | | 719/318 |
| 2014/0324862 A1* | 10/2014 | Bingham | ................ | G06F 16/26 |
| | | | | 707/737 |
| 2015/0026167 A1* | 1/2015 | Neels | .................. | G06F 16/9535 |
| | | | | 707/723 |
| 2016/0036716 A1* | 2/2016 | Pal | ...................... | H04L 67/2804 |
| | | | | 709/207 |
| 2016/0100322 A1* | 4/2016 | Ekambaram | .......... | H04W 24/02 |
| | | | | 455/418 |
| 2017/0046806 A1* | 2/2017 | Haldenby | ............ | G06Q 20/367 |
| 2017/0078922 A1* | 3/2017 | Raleigh | ................. | H04W 28/10 |
| 2018/0091559 A1* | 3/2018 | Luger | .................. | H04L 63/308 |

FOREIGN PATENT DOCUMENTS

| | | | | |
|---|---|---|---|---|
| JP | 2016213712 A | * 12/2016 | ............... | H04L 7/04 |
| WO | WO-2017017265 A1 | * 2/2017 | ............ | H04W 16/26 |

* cited by examiner

*Primary Examiner* — Charles T Shedrick

(57) ABSTRACT

A method of intelligent persistent mobile device management connectivity, including establishing a session between a mobile device and a mobile device management provider, directing the mobile device by the mobile device management provider to perform a successive operation, maintaining the established session between the mobile device and the mobile device management provider while the mobile device is online and periodically checking the mobile device management communication at a communication frequency, wherein the communication frequency is based on a performance feedback parameter.

18 Claims, 9 Drawing Sheets

INTELLIGENT PERSISTENT MOBILE DEVICE MANAGEMENT

TECHNICAL FIELD OF THE APPLICATION

This application relates to notification messaging, specifically intelligent persistent notification messaging

BACKGROUND OF THE APPLICATION

Current persistent socket connections with machines, allow for point-to-point network communication, however, mobile device management solutions are short lived communication with a mobile device. After the mobile device management communication is sent from the provider, the mobile device management network tells the mobile device to check-in for a message from the mobile device management provider. Current mobile device management providers treat this as a single transaction, and further communication requires reaching out directly again via the mobile device management communication.

Current mobile device management has the mobile device management provider send a push notification as an http request. Current systems then communicate directly with the mobile device and instruct the device to check-in to the mobile device management provider for its operation. The mobile device management provider does not have direct communication with the mobile device and hence communication is first invoked via the push notification. Additionally, current mobile device management does not maintain the mobile device checks-in in a sequential or prioritized structure.

What is needed is an intelligent persistent mobile device management (MDM) communication that is based on performance feedback parameters from the mobile device, in essence, the MDM is aware of the state of the mobile device and the network availability. Additionally, within persistent communication, sequential and prioritized operations are orchestrated.

SUMMARY OF THE APPLICATION

Example embodiments of the present application provide at least a first method of intelligent persistent mobile device management connectivity including at least one of establishing a session between a mobile device and a mobile device management provider, directing the mobile device by the mobile device management provider to perform a successive operation, maintaining the established session between the mobile device and the mobile device management provider while the mobile device is online and periodically checking the mobile device management communication at a communication frequency, wherein the communication frequency is based on a performance feedback parameter.

An example embodiment of a non-transitory computer readable storage medium to store instructions that when executed causes a processor to perform at least one of establishing a session between a mobile device and a mobile device management provider, directing the mobile device by the mobile device management provider to perform a successive operation, maintaining the established session between the mobile device and the mobile device management provider while the mobile device is online and periodically checking the mobile device management communication at a communication frequency, wherein the communication frequency is based on a performance feedback parameter.

Another example of the present application provide at least a second method of intelligent persistent mobile device management connectivity including at least one of establishing a session between a mobile device and a mobile device management provider, directing the mobile device by the mobile device management provider to perform a successive operation, wherein the successive operation is at least one of sequentially orchestrated and prioritized, maintaining the established session between the mobile device and the mobile device management provider while the mobile device is online and periodically checking the mobile device management communication at a communication frequency, wherein the communication frequency is based on a performance feedback parameter.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

This disclosure illustrates examples of mobile device performance aware persistent notification. Currently, notifications do not track and are unaware of the performance characteristics of the mobile device to which notifications are sent or the network availability. The notification is sent regardless of the state of the mobile device, if the mobile device battery is low, the processor load is high or the network is congested, the notifications are sent. What is sought in part is a notification structure that is aware of the state of the mobile device and adjusts the notifications based on that state of awareness.

The disclosure discusses in part an application resident on a server. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer, a laptop, a personal computing tablet, a smartphone or a device with a processor and memory. The disclosed system mobile device management is utilized in devices running iOS, ipadOS, macOS, tvOS and the like, i.e. mobile devices.

Figure 1:
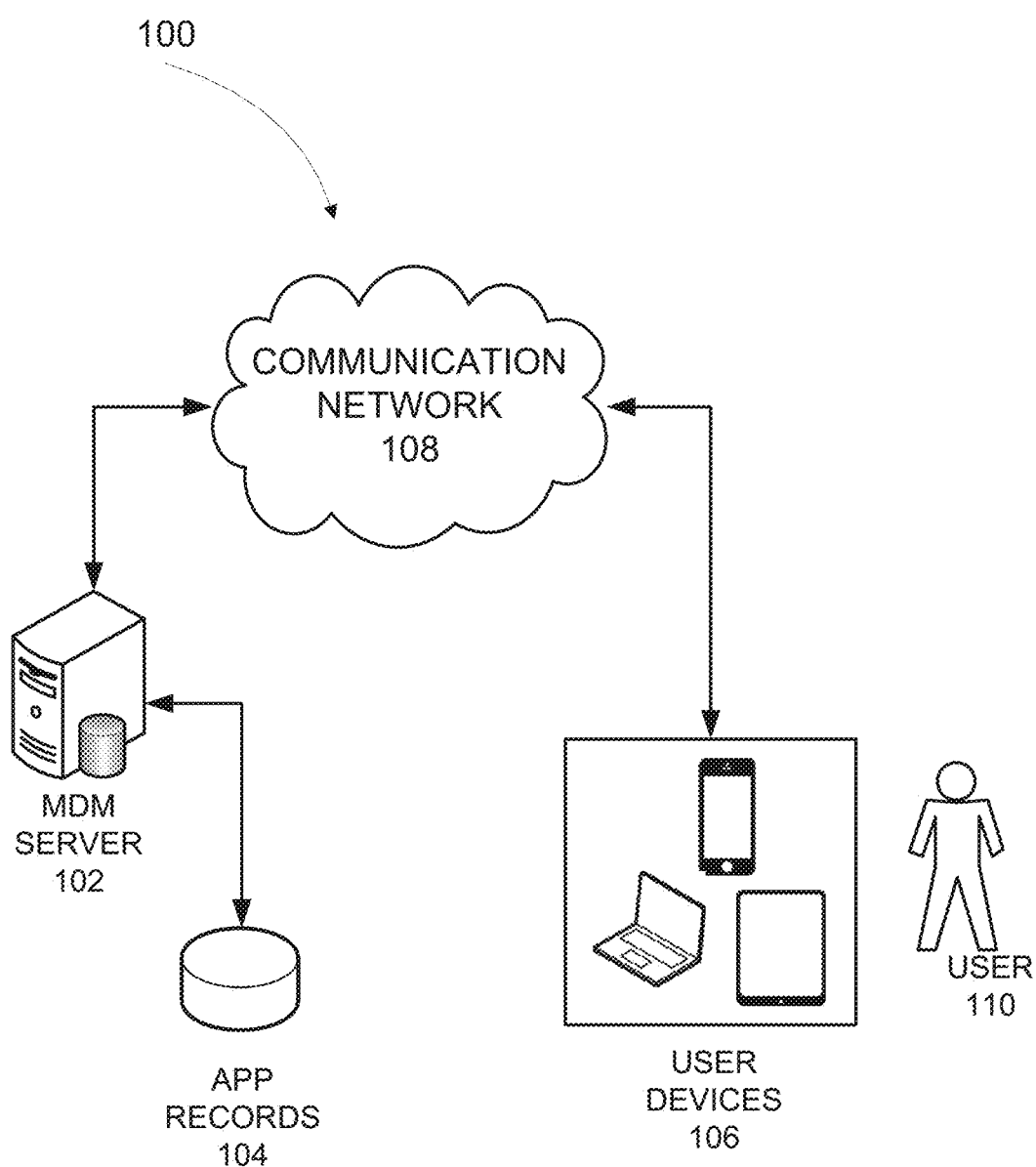
FIG. 1 illustrates an example of the intelligent persistent mobile device management platform according to example embodiments.

FIG. 1 illustrates a network configuration of the intelligent persistent mobile device management application according to example embodiments. Referring to FIG. 1, the network includes a central server 102 with application records 104. The central server sends the persistent notifications. The applications records store historical data on the statistics and use of the application receiving the persistent notification. Depending upon history of the application, its use and the status of the mobile device, recommendations are made to the central server to adjust the frequency of notifications. The intelligent persistent mobile device management communicates its status, the status of the application and history of its use and the status of the mobile device to the central server. The central server 102 communicates to the mobile device 106 through the communication network 108. The mobile device 106 is utilized by user 110.

Figure 2:
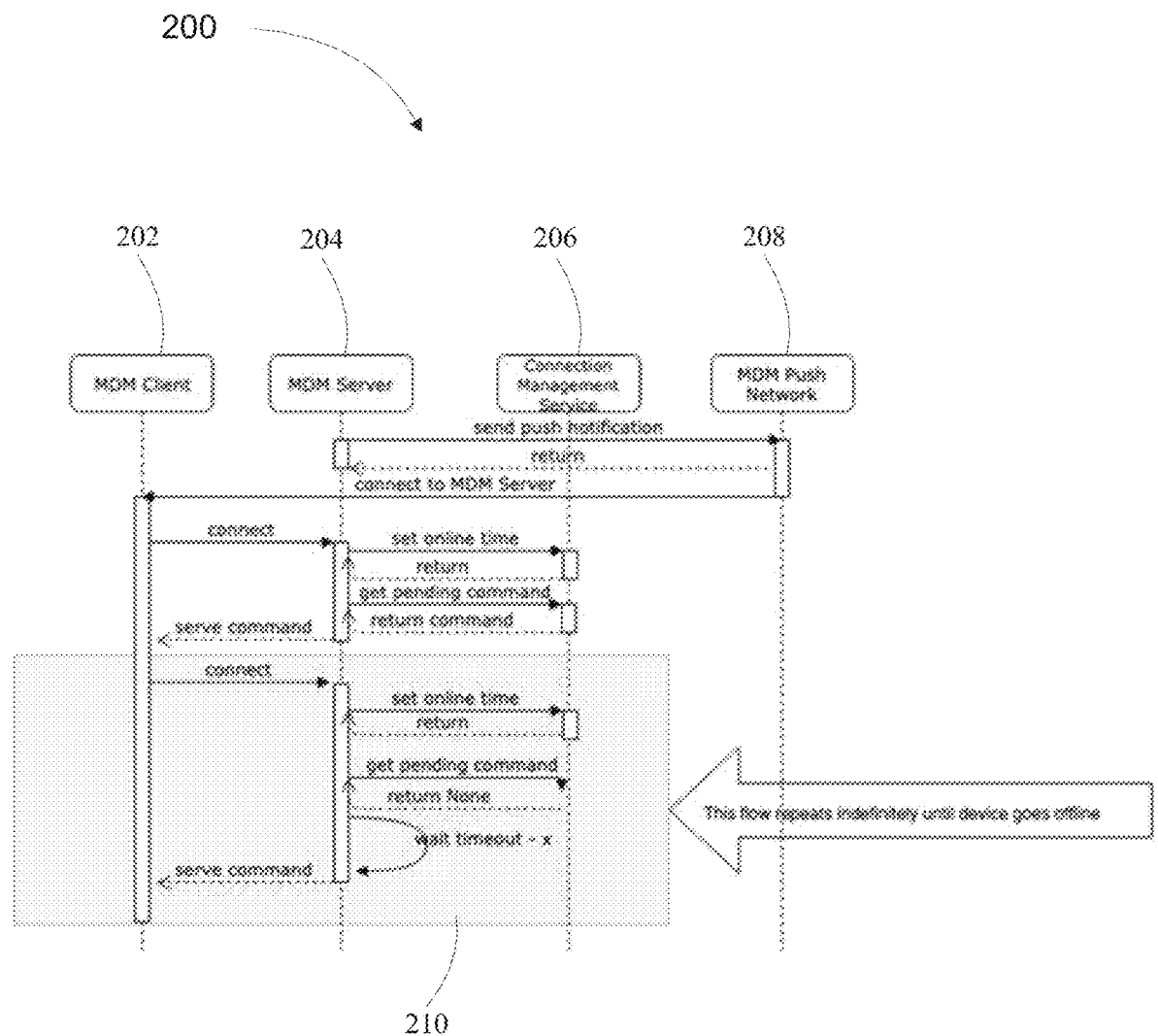
FIG. 2 illustrates a flow diagram of the intelligence persistent mobile device management according to example embodiments.

FIG. 2 illustrates a flow between a mobile device management client 202, mobile device management (MDM) server 204, connection management service 206 and mobile device management communication network 208. The MDM server 204 sends an MDM communication to the MDM communication network 208. The MDM communication network connects to the mobile device client, notifying the mobile device to check-in with the MDM provider for a new operation. A connection is made between the MDM client 202 and the MDM server 204 a set online time is sent to the connection management service 206 for a get pending command. If a serve command is received it is sent from the MDM server 204 to the MDM client 202.

In a persistent MDM shown in block 210, the connection between the MDM client 202 and the MDM server 204 is established. A set online time is established between the MDM server and the connection management service and a get pending command is communicated between the MDM server and the connection management service and is repeated indefinitely until the MDM client goes offline. If a serve command is put into effect, it is sent to the MDM client.

Figure 3:
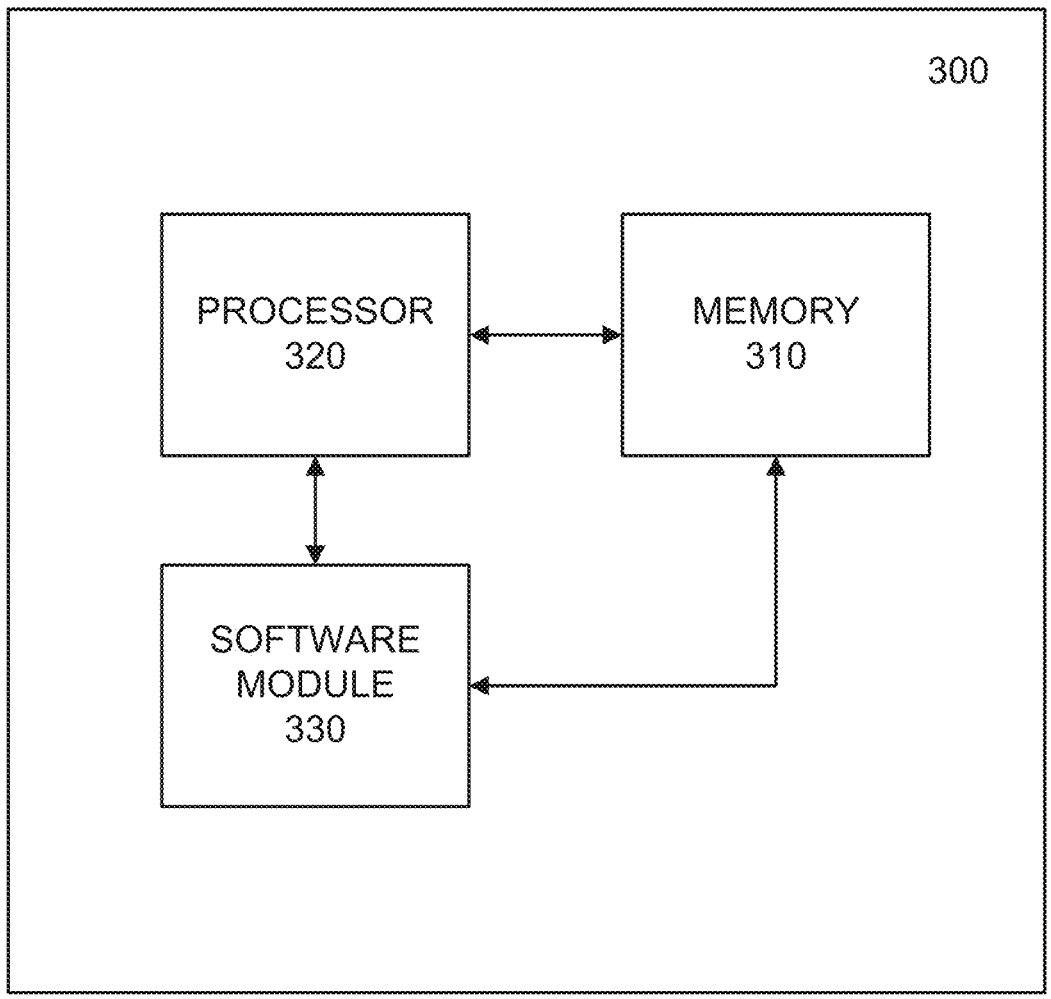
FIG. 3 illustrates an example network entity device to store instructions, software, and corresponding hardware for executing the same, according to example embodiments of the present application.

FIG. 3 illustrates a memory 310 and a processor 320 which may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair to receive and transmit communication signals.

Sequential Operations

In the disclosed persistent communication, operations may be sequentially orchestrated by the mobile device management provider. This sequential orchestration allows layering of commands to potentially reduce redundancy of commands and allow reuse of data to reduce download time and the number of execution cycles.

Prioritization of Operations

In the disclosed persistent communication, operations may be prioritized. This prioritization of commands allows critical functions to be carried out first, or it may allow a reduction in redundancy of command execution and allow data reuse to reduce data downloads.

Dynamic Prioritization

In the instant disclosure when a machine is offline with mobile device management commands queued up, when the machine returns to online status, checks-in may dynamically prioritize the operations to speed up the implementation of commands and attend to critical needs first.

Figure 4:
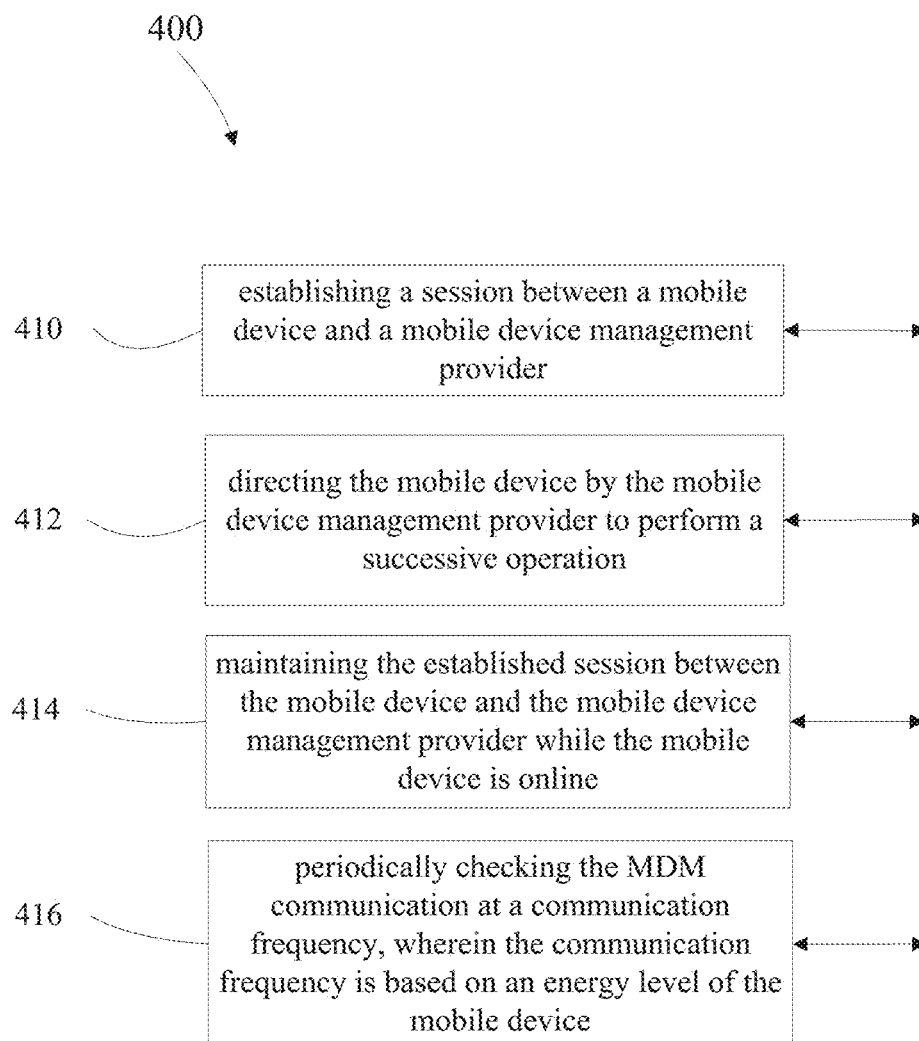
FIG. 4 illustrates a first method, according to example embodiments of the present application.

FIG. 4 illustrates a first method of intelligent persistent mobile device management connectivity including establishing 410 a session between a mobile device and a mobile device management provider, directing 412 the mobile device by the mobile device management provider to perform a successive operation, maintaining 414 the established session between the mobile device and the mobile device management provider while the mobile device is online and periodically checking 416 the MDM communication at a communication frequency, wherein the communication frequency is based on an energy level of the mobile device. The energy level of the mobile device may be sent from the mobile device to the MDM server on a periodic basis for use by the MDM server in determining a proper communication frequency.

The method may also include reducing the communication frequency when the energy level of the mobile device is below an energy threshold and increasing the communication frequency when the energy level of the mobile device is above an energy threshold.

The method may also include directing of the successive operation in a sequential manner by the mobile device management provider and/or prioritized by the mobile device management provider. If the mobile device is offline, when it returns to online status the directing of the successive operation may be dynamically prioritized by the mobile device management provider.

The communication frequency may be user configurable, based on application priority and based on application usage history.

Figure 5:
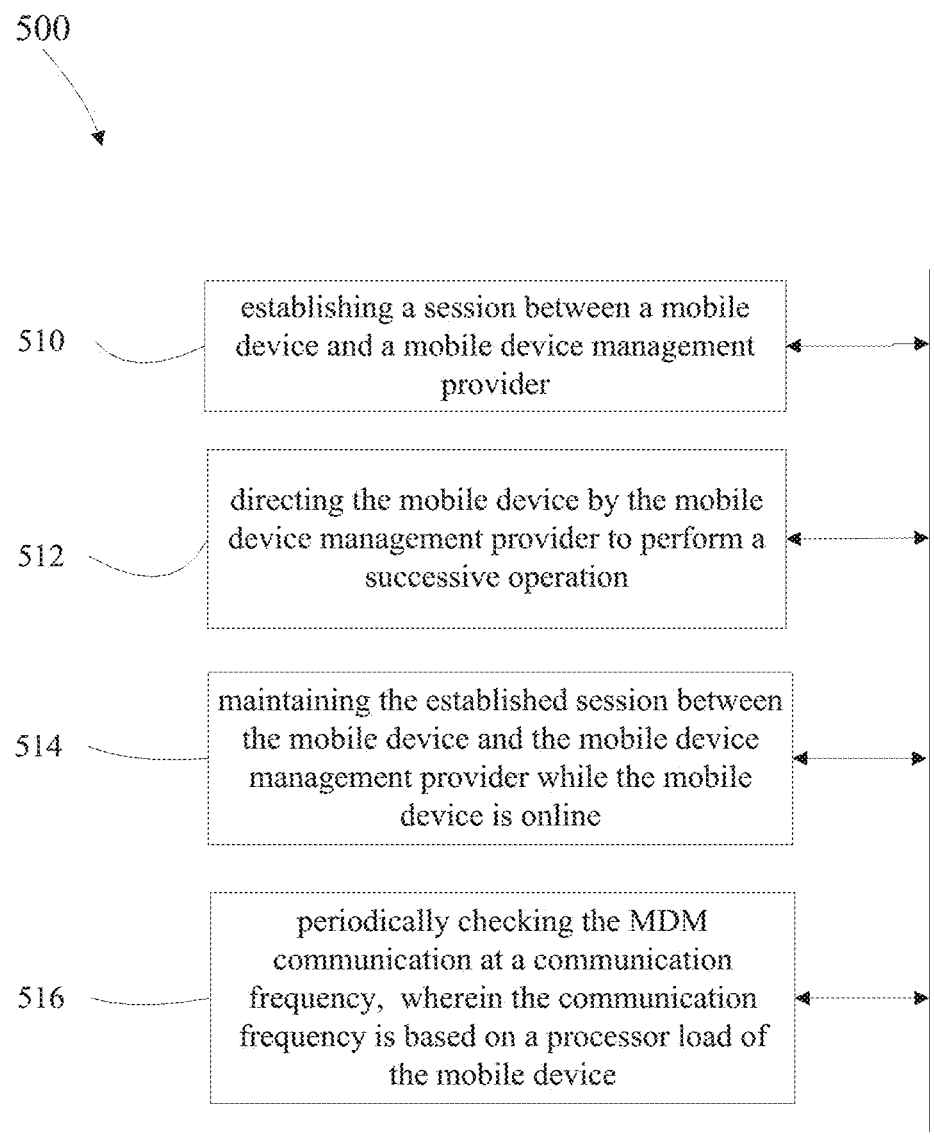
FIG. 5 illustrates a second method, according to example embodiments of the present application.

FIG. 5 illustrates a second method of intelligent persistent mobile device management connectivity including establishing 510 a session between a mobile device and a mobile device management provider, directing 512 the mobile device by the mobile device management provider to perform a new or successive operation, maintaining 514 the established session between the mobile device and the mobile device management provider while the mobile device is online and periodically checking 516 the mobile device management communication at a communication frequency, wherein the communication frequency is based on a processor load of the mobile device. The processor load of the mobile device may be sent from the mobile device to the MDM server on a periodic basis for use by the MDM server in determining a proper communication frequency.

Figure 6:
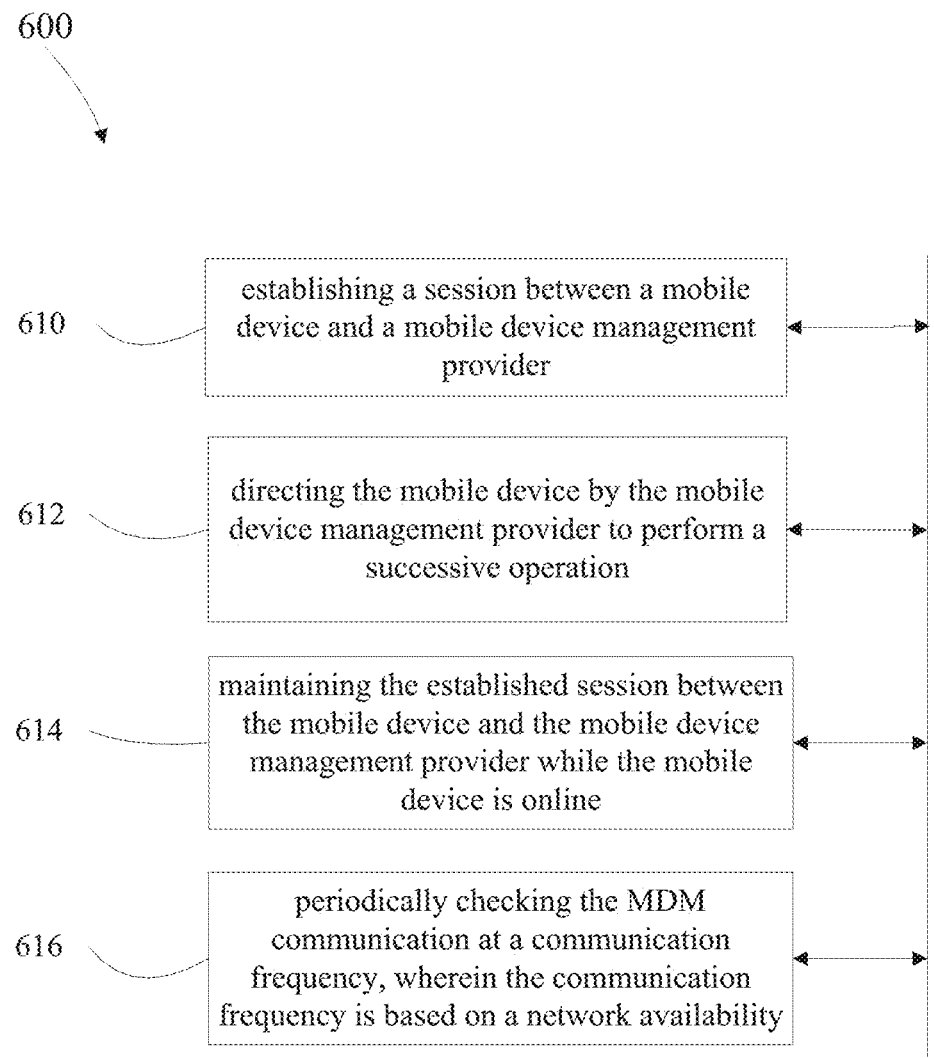
FIG. 6 illustrates a third method, according to example embodiments of the present application.

FIG. 6 illustrates a third method of intelligent persistent mobile device management connectivity including establishing 610 a session between a mobile device and a mobile device management provider, directing 612 the mobile device by the mobile device management provider to perform a new or successive operation, maintaining 614 the established session between the mobile device and the mobile device management provider while the mobile device is online and periodically checking 616 the mobile device management communication at a communication frequency, wherein the communication frequency is based on a network availability of the mobile device. The network availability or congestion experienced by the mobile device may be sent from the mobile device to the MDM server on a periodic basis for use by the MDM server in determining a proper communication frequency.

Figure 7:
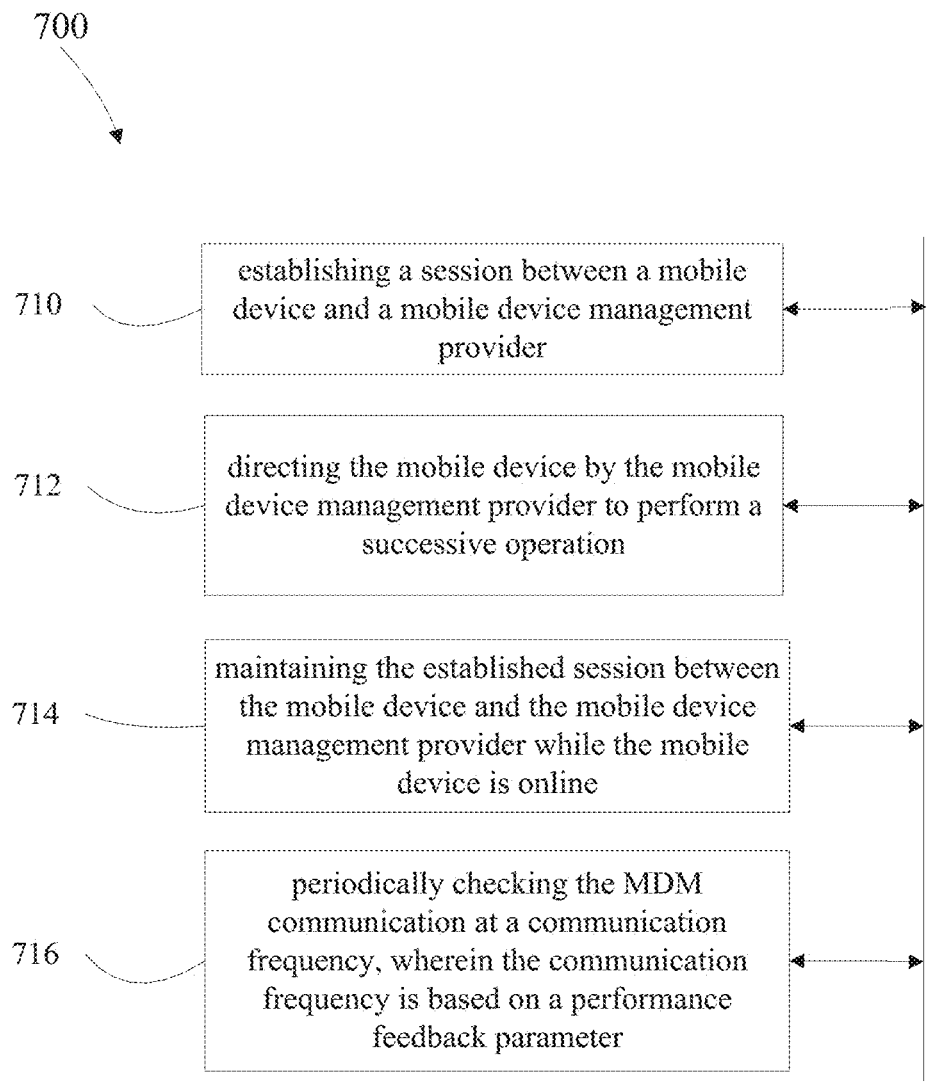
FIG. 7 illustrates a fourth method, according to example embodiments of the present application.

FIG. 7 illustrates a fourth method of intelligent persistent mobile device management connectivity, including establishing 710 a session between a mobile device and a mobile device management provider, directing 712 the mobile device by the mobile device management provider to perform a successive operation, maintaining 714 the established session between the mobile device and the mobile device management provider while the mobile device is online and periodically checking 716 the mobile device management communication at a communication frequency, wherein the communication frequency is based on a performance feedback parameter.

The performance feedback parameter may be an energy level of the mobile device, a processor load of the mobile device, a network availability of the mobile device and at least two of an energy level of the mobile device, a processor load of the mobile device and a network availability of the mobile device.

The method may further include reducing the communication frequency when the performance feedback parameter of the mobile device is below a predetermined threshold and increasing the communication frequency when the performance feedback parameter of the mobile device is above a predetermined threshold.

The method may also include directing of the successive operation in a sequential manner by the mobile device management provider and/or prioritized by the mobile device management provider. If the mobile device is offline, when it returns to online status the directing of the successive operation may be dynamically prioritized by the mobile device management provider.

The communication frequency may be user configurable, based on an application priority and based on an application usage history.

Figure 8:
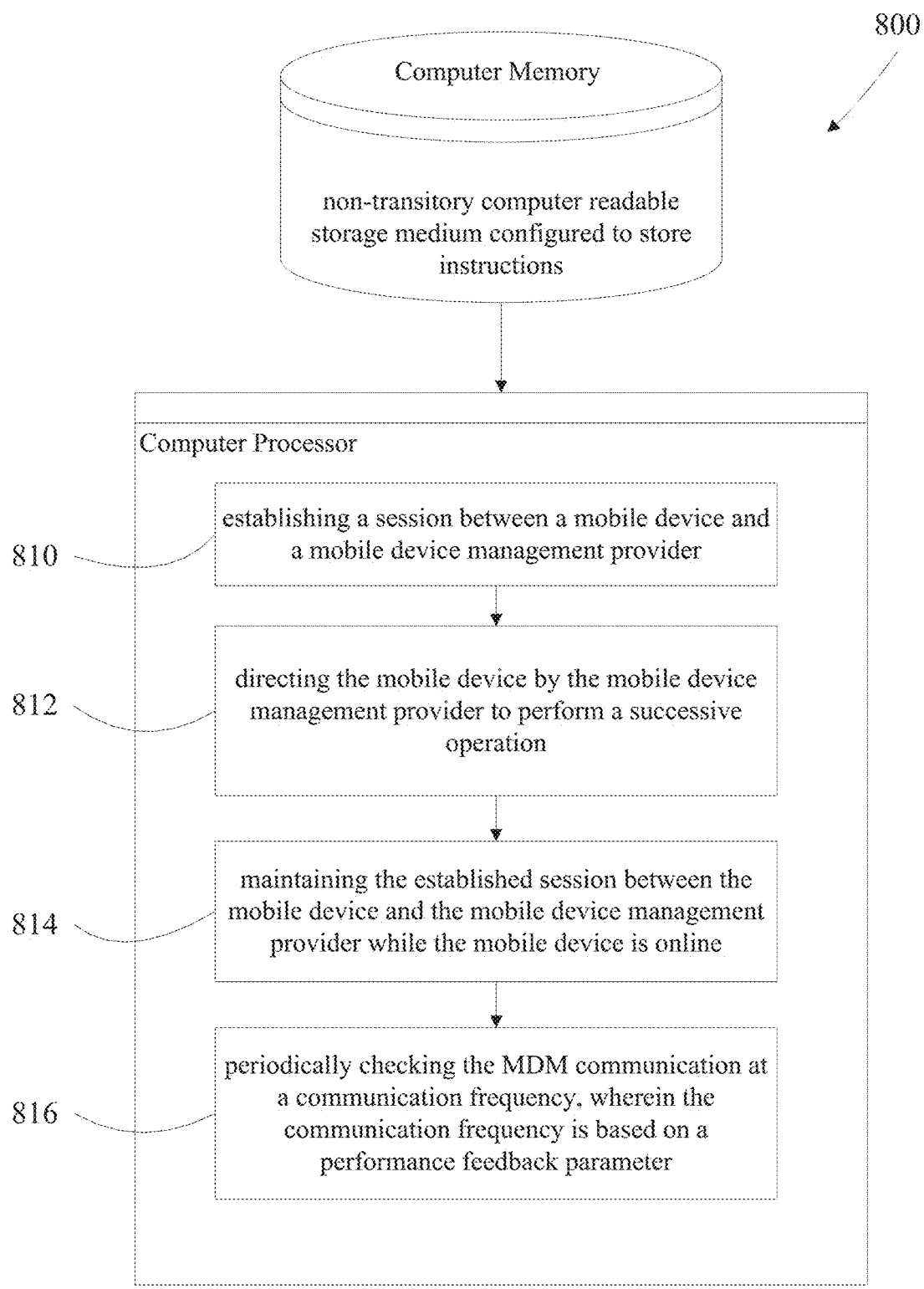
FIG. 8 illustrates a non-transitory computer readable storage medium, according to example embodiments of the present application.

FIG. 8 illustrates a non-transitory computer readable storage medium to store instruction that when executed causes a processor to perform establishing 810 a session between a mobile device and a mobile device management provider, directing 812 the mobile device by the mobile device management provider to perform a successive operation, maintaining 814 the established session between the mobile device and the mobile device management provider while the mobile device is online and periodically checking 816 the mobile device management communication at a communication frequency, wherein the communication frequency is based on a performance feedback parameter.

Figure 9:
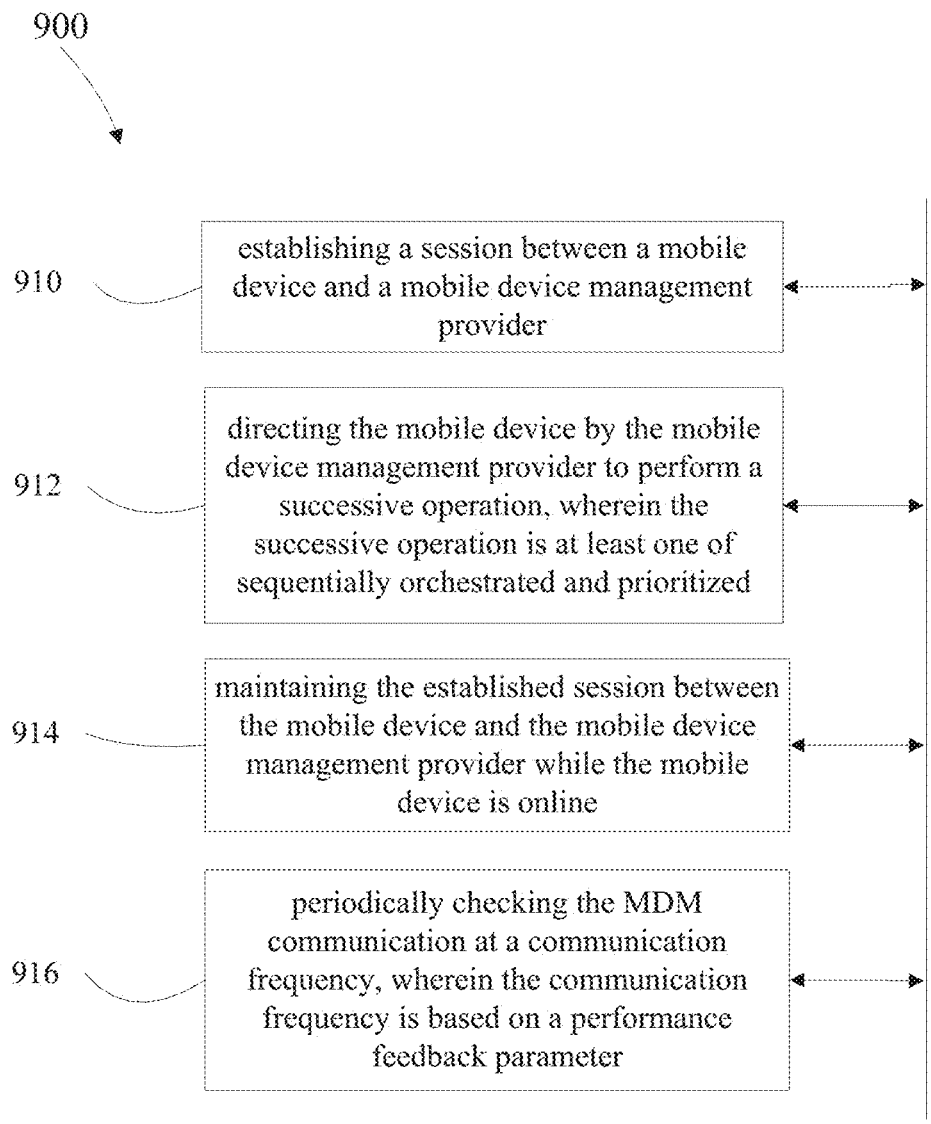
FIG. 9 illustrates a fifth method, according to example embodiments of the present application.

FIG. 9 illustrates a fourth method of intelligent persistent mobile device management connectivity, including establishing 910 a session between a mobile device and a mobile device management provider, directing 912 the mobile device by the mobile device management provider to perform a successive operation where the successive operation is at least one of sequentially orchestrated and prioritized, maintaining 914 the established session between the mobile device and the mobile device management provider while the mobile device is online and periodically checking 916 the mobile device management communication at a communication frequency, wherein the communication frequency is based on a performance feedback parameter.

The performance feedback parameter may be an energy level of the mobile device, a processor load of the mobile device, a network availability of the mobile device and at least two of an energy level of the mobile device, a processor load of the mobile device and a network availability of the mobile device.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a user device, such as a smartphone, cellular phone, tablet device, laptop or other computing device with a memory and processor, may communicate with another computing device and/or a server to provide an intelligent persistent mobile device management system.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method of intelligent persistent mobile device management connectivity, the method comprising:
    establishing a session between a mobile device and a mobile device management provider;
    when a machine is offline with queued mobile device management commands,
    identifying, by the mobile device management provider, that the mobile device has switched from an offline status to an online status;
    prioritizing, by the mobile device management provider, a direction to the mobile device to perform a successive operation based on the identifying;
    maintaining the established session between the mobile device and the mobile device management provider while the mobile device is online;
    periodically receiving, by the mobile device management provider, a performance feedback parameter of the mobile device; and
    setting, by the mobile device management provider, a frequency of communication between the mobile device management provider and the mobile device based on the performance feedback.

2. The method of claim 1, wherein the performance feedback parameter is at least one of:
    an energy level of the mobile device, a processor load of the mobile device, and a network availability of the mobile device.

3. The method of claim 1, wherein the prioritizing the direction to the mobile device to perform a successive operation is sequentially orchestrated by the mobile device management provider.

4. The method of claim 1, wherein the prioritizing the direction to the mobile device to perform a successive operation is dynamically prioritized by the mobile device management provider.

5. The method of claim 1, further comprising,
reducing the frequency of communication when the performance feedback parameter of the mobile device is below a predetermined threshold.

6. The method of claim 1, further comprising:
increasing the frequency of communication when the performance feedback parameter of the mobile device is above a predetermined threshold.

7. The method of claim 1, wherein the frequency of communication is user configurable.

8. The method of claim 1, wherein the frequency of communication is based on at least one of:
an application priority and an application usage history.

9. A non-transitory computer readable storage medium storing one or more instructions that when executed by a processor of a mobile device management provider causes the processor to perform: establishing a session between a mobile device and a mobile device management provider; when a machine is offline with queued mobile device management commands, identifying that the mobile device has switched from an offline status to an online status; prioritizing a direction to the mobile device to perform a successive operation based on the identifying which is at least one of sequentially orchestrated by the mobile device management provider; maintaining the established session between the mobile device and the mobile device management provider while the mobile device is online; periodically receiving a performance feedback parameter of the mobile device; and setting a frequency of communication between the mobile device management provider and the mobile device based on the performance feedback parameter.

10. The non-transitory computer readable storage medium of claim 9, wherein the performance feedback parameter is at least one of:
an energy level of the mobile device, a processor load of the mobile device, and a network availability of the mobile device.

11. The non-transitory computer readable storage medium of claim 9, wherein prioritizing the direction to the mobile device to perform a successive operation is sequentially orchestrated by the mobile device management provider.

12. The non-transitory computer readable storage medium of claim 9, wherein the prioritizing the direction to the mobile device to perform a successive operation is dynamically prioritized by the mobile device management provider.

13. The non-transitory computer readable storage medium of claim 9, wherein the frequency of communication is user configurable.

14. The non-transitory computer readable storage medium of claim 9, wherein the frequency of communication is based on at least one of:
an application priority and an application usage history.

15. The non-transitory computer readable storage medium of claim 9, wherein the one or more instructions further cause the processor to perform:
reducing the frequency of communication when the performance feedback parameter of the mobile device is below a predetermined threshold.

16. The non-transitory computer readable storage medium of claim 9, wherein the one or more instructions further cause the processor to perform:
increasing the frequency of communication when the performance feedback parameter of the mobile device is above a predetermined threshold.

17. A method of intelligent persistent mobile device management connectivity, the method comprising:
establishing a session between a mobile device and a mobile device management provider;
when a machine is offline with queued mobile device management commands,
identifying, by the mobile device management provider, that the mobile device has switched from an offline status to an online status;
prioritizing, by the mobile device management provider, a direction to the mobile device to perform a successive operation based on the identifying;
maintaining the established session between the mobile device and the mobile device management provider while the mobile device is online;
periodically receiving, by the mobile device management provider, a performance feedback parameter of the mobile device; and
setting a frequency of communication between the mobile device management provider and the mobile device based on the performance feedback.

18. The method of intelligent persistent mobile device management connectivity of claim 17, wherein the performance feedback parameter is at least one of:
an energy level of the mobile device, a processor load of the mobile device, and a network availability of the mobile device.

* * * * *